US011248635B2

(12) United States Patent
Boettcher et al.

(10) Patent No.: US 11,248,635 B2
(45) Date of Patent: Feb. 15, 2022

(54) CLIP FOR SECURING OBJECTS

(71) Applicant: Amazing Magnets, LLC, Anaheim, CA (US)

(72) Inventors: Timothy Paul Boettcher, Orange, CA (US); Luke T. Bilisoly, Fullerton, CA (US)

(73) Assignee: Amazing Magnets, LLC, Anaheim, CA (US)

( * ) Notice: Subject to any disclaimer, the term of this patent is extended or adjusted under 35 U.S.C. 154(b) by 0 days.

(21) Appl. No.: 16/946,108

(22) Filed: Jun. 5, 2020

(65) Prior Publication Data

US 2020/0386251 A1 Dec. 10, 2020

Related U.S. Application Data

(60) Provisional application No. 62/857,621, filed on Jun. 5, 2019.

(51) Int. Cl.
*F16B 2/10* (2006.01)
*F16B 1/00* (2006.01)
*B42F 1/00* (2006.01)

(52) U.S. Cl.
CPC ............... *F16B 2/10* (2013.01); *B42F 1/006* (2013.01); *F16B 1/00* (2013.01); *F16B 2001/0035* (2013.01)

(58) Field of Classification Search
CPC .... B42F 1/006; F16B 1/00; F16B 2001/0035; F16B 2/10
See application file for complete search history.

(56) References Cited

U.S. PATENT DOCUMENTS

| 2,448,611 | A | * | 9/1948 | Stanley | B42D 9/004 116/234 |
| 2,667,678 | A | | 2/1954 | Hargrave et al. | |
| 3,097,406 | A | * | 7/1963 | Yarborough | A45C 13/185 24/3.7 |
| 4,255,837 | A | | 3/1981 | Holtz | |

(Continued)

FOREIGN PATENT DOCUMENTS

| CN | 207199860 U | 4/2018 |
| JP | S61-137306 A | 6/1986 |
| KR | 10-2005-0009003 A | 1/2005 |

*Primary Examiner* — David M Upchurch
(74) *Attorney, Agent, or Firm* — Knobbe Martens Olson & Bear, LLP

(57) ABSTRACT

A clip is provided that is configured to secure an object therein. The clip includes a front portion having a first end, a second end opposite the first end, an inner surface, and an outer surface. The outer surface of the front portion is configured to face away from the object. The base portion has a first end, a second end opposite the first end, an inner surface, and an outer surface. The inner surface of the base portion is configured to face the inner surface of the front portion. The outer surface of the base portion is configured to face away from the outer surface of the front portion. The clip includes a connector coupling the front portion to the base portion such that the front portion is movable in two degrees of freedom relative to the base portion. At least one magnet is coupled to at least one of the front portion and the base portion. The at least one magnet urges the inner surface of the front portion and the inner surface of the base portion together.

24 Claims, 19 Drawing Sheets

(56) References Cited

U.S. PATENT DOCUMENTS

| | | | |
|---|---|---|---|
| 5,682,653 A | 11/1997 | Berglof et al. | |
| D512,906 S * | 12/2005 | Wood | D8/395 |
| 7,469,869 B2 | 12/2008 | Killion | |
| 9,500,209 B2 | 11/2016 | Bonno et al. | |
| 10,330,249 B1 * | 6/2019 | Polen | F16B 2/10 |
| 2003/0046846 A1 * | 3/2003 | Goodman | G09F 3/20 |
| | | | 40/658 |
| 2004/0055616 A1 * | 3/2004 | Twomey | A45D 8/20 |
| | | | 132/277 |
| 2004/0188173 A1 * | 9/2004 | Stilp | A61F 11/14 |
| | | | 181/129 |
| 2005/0023420 A1 | 2/2005 | Sadeh et al. | |
| 2007/0193211 A1 * | 8/2007 | Harrison | A45C 15/00 |
| | | | 52/750 |
| 2007/0200038 A1 | 8/2007 | Dautrey | |
| 2015/0219130 A1 * | 8/2015 | Killion | B42F 1/006 |
| | | | 24/507 |
| 2020/0237083 A1 * | 7/2020 | Jin | A45F 5/02 |

* cited by examiner

CLIP FOR SECURING OBJECTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57. U.S. Provisional Application No. 62/857,621, filed Jun. 5, 2019 is hereby incorporated by reference herein in its entirety.

BACKGROUND

Field

This application is directed to an apparatus with clipping elements for holding one or more articles, including one or more pieces of paper, the clipping elements being moveable relative to each other to allow for expansion of a space for holding the article(s).

Description of the Related Art

Binder clips are well known for holding paper. Small binder clips can be used for small numbers of papers. Larger binder clips can be used for larger numbers of papers. Binder clips work by application of a spring force to the papers being held. The spring force is generated as the clip is opened. Larger binder clips require greater force to open, which corresponds to the spring force that the binder clip require to hold the papers.

While binder clips can work for holding paper, such clips by themselves cannot be self-supporting on a vertical structure. Blackboards, whiteboards, and more recently glassboards are vertical structures of high focus in schools, businesses and other corporate and group settings. While these spaces are very functional accessories frequently used around them are not well organized.

SUMMARY

A more organized, functional apparatus for holding articles is needed. In one context, such an apparatus could be configured to be self-supporting on a vertical surface such as a blackboard, whiteboard, or glassboard. Other example applications can include providing a clip that can be self-supporting on, without limitation, an object comprising porcelain coated steel, painted steel, epoxy coated steel, a ferrous metal, a ferrous backed glass, and/or a ferrous backed plastic. Further non-limiting examples of such objects are steel filing cabinets, steel shelfing, and/or sheet metal. Preferably such an apparatus is configured to reduce the need for multiple sizes to hold a larger range of the same articles, such as sheets of paper, or other similar articles that are thin and may be organized in stacks the quantity of which may not be known in advance.

In one embodiment, a clip is provided that is configured to secure an object against a marking surface. The clip can have a front portion, a back portion, and a connector. The front portion can have a first end and a second end opposite the first end. The front portion can have an inner surface and an outer surface. The inner surface of the front portion can be configured to contact and/or apply a holding force to the object. The outer surface of the front portion can be configured to face away from the marking surface.

The clip further includes a base portion with a first end, a second end opposite the first end. The base portion can also have an inner surface, and an outer surface. The inner surface of the base portion can be configured to contact and/or apply a holding force to the object. The front portion and the base portion are examples of clipping elements. The outer surface of the base portion can be configured to be disposed adjacent to the marking surface.

The clip can further include a connector coupling the front portion to the base portion. The coupling provided by the connector allows the front portion to move relative to the base portion. The connector can include a pivot widening mechanism. The connector can be positioned between the second end and the first end of both the front portion and the base portion. The connector can be configured to enable the first end of the front portion and the first end of the base portion to be separated by applying a force urging the second end of the front portion and the second end of the base portion together.

The pivot widening mechanism can include a slot on the front portion and a projection, e.g., a pin, on the base portion. In a modified embodiment, a slot can be formed on a base portion and a projection, e.g., a pin, can be provided on the front portion. The slot can be configured to receive the projection. The slot and projection can coordinate to allow the front portion and the base portion to pivot and/or translate relative to each other as the projection moves along the slot.

A first magnet can be coupled to the front portion and a second magnet can be coupled to the base portion. The clip can be configured to grip the object between the first magnet and the second magnet. The first magnet and second magnet can be arranged such that the first magnet is magnetically attracted to the second magnet. The magnetic attraction can operate across the space in which an object is to be positioned or held in some embodiments. In other embodiments, magnets can repel one another to cause a clamping or gripping force across the space in which an object is to be positioned or held. Further, the second magnet can be configured to secure the clip to the marking surface.

In an embodiment, a clip can be configured to secure an object against a marking surface. The clip can have a front portion, a base portion, and a connector. The front portion can have a first end, a second end opposite the first end, an inner surface, and an outer surface. The inner surface of the front portion can be configured to face the object. The outer surface of the front portion can be configured to face away from the marking surface.

The base portion can have a first end, a second end opposite the first end, an inner surface, and an outer surface. The inner surface of the base portion can be configured to face the object. The outer surface of the base portion can be configured to be disposed adjacent to the marking surface.

The connector can couple the front portion to the base portion such that the front portion is movable relative to the base portion. The connector can have a pivot widening mechanism. The pivot widening mechanism can have a slot on one of the front portion and the base portion. The pivot widening mechanism can have a projection on the other of the front portion and the base portion. The pivot widening mechanism can allow the front portion and the base portion to pivot and to translate relative to each other as the projection moves along the slot.

At least one magnet can be coupled to one of the front portion and the base portion. The at least one magnet can urge the inner surface of the front portion and the inner surface of the base portion together to apply a holding force to the object.

In an embodiment, a clip is configured to secure an object against a marking surface. The clip can have a front portion, a base portion, and a connector. The front portion can have a first end, a second end opposite the first end, an inner surface, and an outer surface. The outer surface of the front portion can be configured to face away from the marking surface.

The base portion can have a first end, a second end opposite the first end, an inner surface, and an outer surface. The inner surface of the base portion can be configured to face the inner surface of the front portion. The outer surface of the base portion can be configured to be disposed adjacent to the marking surface.

A connector can couple the front portion to the base portion such that the front portion is movable in two degrees of freedom relative to the base portion. The connector can be configured to allow the inner surface of the front portion and the inner surface of the base portion to be substantially aligned over a range of separation distances between the inner surface of the front portion and the inner surface of the base portion.

At least one magnet can be coupled to at least one of the front portion and the base portion. The at least one magnet can urge the inner surface of the front portion and the inner surface of the base portion together.

We have invented new, original and ornamental designs for a clip for retaining paper and other similar articles. The following contains a specification of the clip design, reference being had to certain of the accompanying drawings, which form a part hereof.

A clip is provided that is configured to secure an object therein. The clip includes a front portion having a first end, a second end opposite the first end, an inner surface, and an outer surface. The outer surface of the front portion is configured to face away from the object. The base portion has a first end, a second end opposite the first end, an inner surface, and an outer surface. The inner surface of the base portion is configured to face the inner surface of the front portion. The outer surface of the base portion is configured to face away from the outer surface of the front portion. The clip includes a connector coupling the front portion to the base portion such that the front portion is movable in two degrees of freedom relative to the base portion. At least one magnet is coupled to at least one of the front portion and the base portion. The at least one magnet urges the inner surface of the front portion and the inner surface of the base portion together. The clips disclosed herein can be but are not required to be configured for connection to other articles, e.g., vertical support surfaces as discussed above.

The clip can work by magnetic attraction across a space configured to receive an object. The clip can work by magnetic repulsion on a side of a clip opposite from a space configured to receive an object, e.g., with a pivot disposed therebetween.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No aspects of this disclosure are essential or indispensable.

BRIEF DESCRIPTION OF THE DRAWINGS

These and other features, aspects and advantages are described below with reference to the drawings, which are intended to illustrate but not to limit the inventions. In the drawings, like reference characters denote corresponding features consistently throughout similar embodiments. The following is a brief description of each of the drawings.

FIG. 2A-1 to 2A-9 illustrates a perspective view of a closed configuration of an embodiment of a clip, FIG. 2A-2 is a side view of an embodiment of a clip similar to that of FIG. 2A-1.

FIG. 2A-3 is a top view of an embodiment of a clip similar to that of FIG. 2A-1.

FIG. 2A-4 is a bottom view of an embodiment of a clip similar to that of FIG. 2A-1.

FIG. 2A-5 is a front view of an embodiment of a clip similar to that of FIG. 2A-1.

FIG. 2A-6 is a back view of an embodiment of a clip similar to that of FIG. 2A-1.

FIG. 2A-7 is an additional perspective view of an embodiment of a clip similar to that of FIG. 2A-1.

FIG. 2A-8 is an additional perspective view of an embodiment of a clip similar to that of FIG. 2A-1 in an open configuration.

FIG. 2A-9 is a side view of an embodiment of a clip similar to that of FIG. 2A-1 in an open configuration.

FIG. 2B-1 is a perspective view of a closed configuration of another embodiment of a clip.

FIG. 2B-2 is a side view of a clip similar to that of FIG. 2B-1.

FIG. 2B-3 is a top view of a clip similar to that of FIG. 2B-1.

FIG. 2B-4 is a bottom view of a clip similar to that of FIG. 2B-1.

FIG. 2B-5 is a front view of a clip similar to that of FIG. 2B-1.

FIG. 2B-6 is a back view of a clip similar to that of FIG. 2B-1.

FIG. 3 is a rear perspective view of the clip of FIG. 1 with a traction pad removed to show components under the pad.

FIG. 4 is a perspective cross-sectional view of the clip of FIG. 1 illustrating magnets within the clip.

FIG. 5 is a longitudinal cross-sectional view of the clip of FIG. 1 holding papers and illustrating magnets within the clip.

FIG. 6 is a perspective view of the clip of FIG. 1 demonstrating a method of separating a first clip portion from a second clip portion.

FIG. 7 is a side view of the clip of FIG. 1.

FIG. 8 is a rear perspective view of the clip of FIG. 1 with a traction pad attached.

FIG. 9 is a perspective view of another embodiment of a clip.

DETAILED DESCRIPTION OF CERTAIN EMBODIMENTS

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Figure 1:
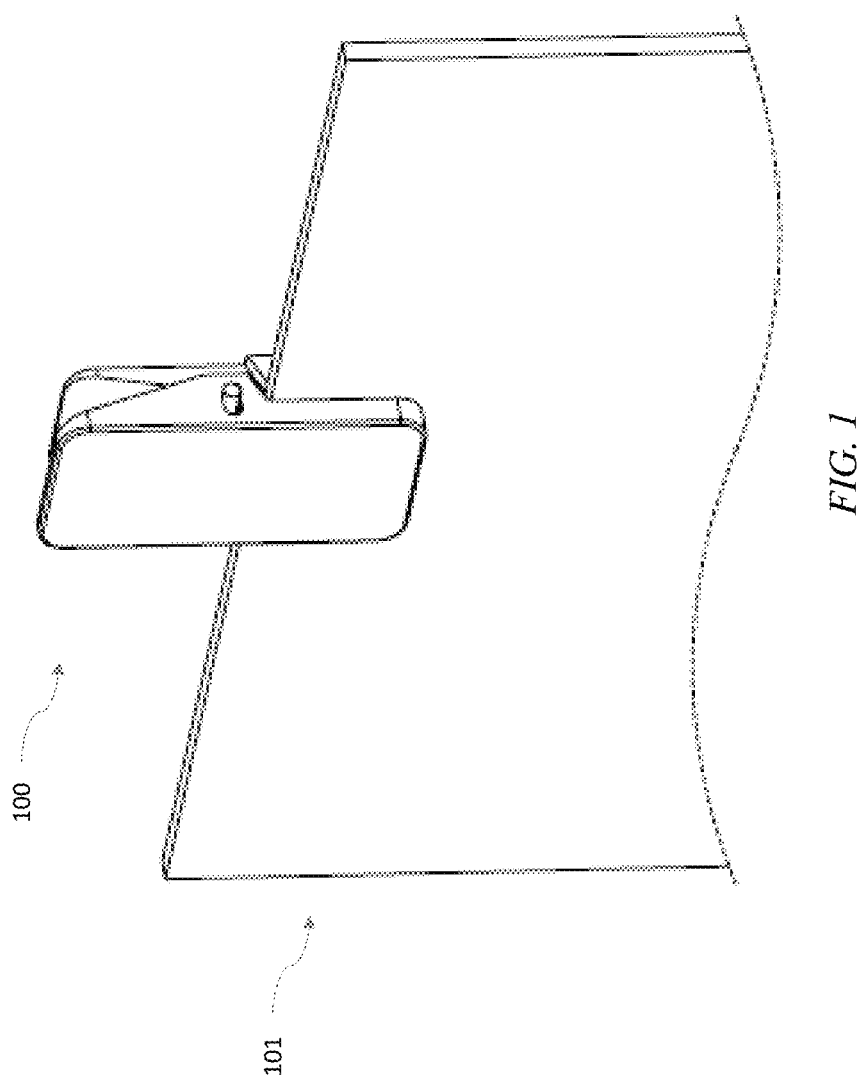
FIG. 1 illustrates an embodiment of a clip holding an object, such as a collection of papers.

FIG. 1 shows a clip 100 that is configured to grasp an object 101. As shown, the clip 100 can be useful for holding papers or another object or objects. The clip 100 can hold the object 101 while simultaneously being coupled to any ferromagnetic surface, e.g., in direct contact with the ferromagnetic surface or acting across a non-magnetic surface, as discussed further below.

Figures 2, 2A:
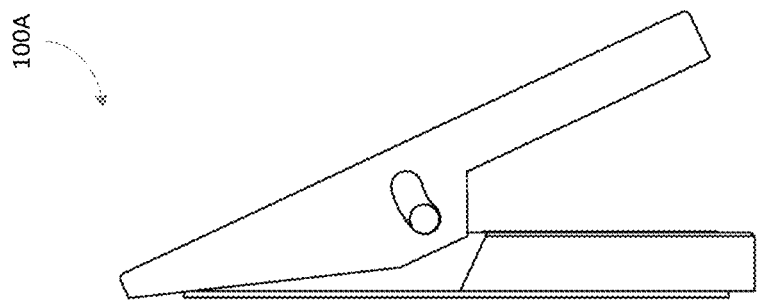
Figures 1, 2A:
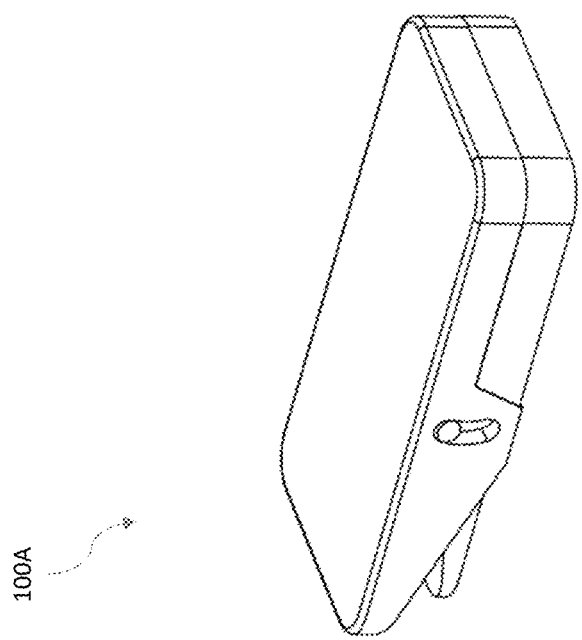
Figures 2, 2A, 3, 4:
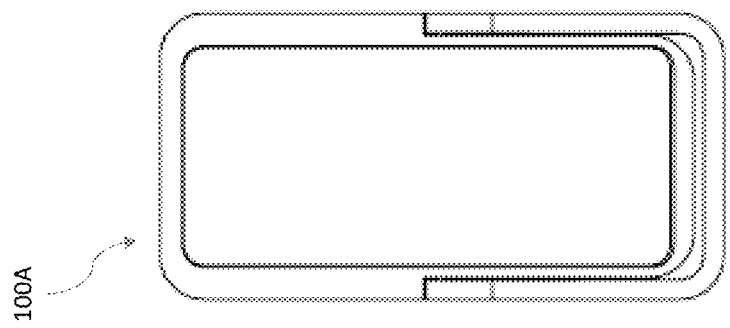
Figures 2, 2A, 3:
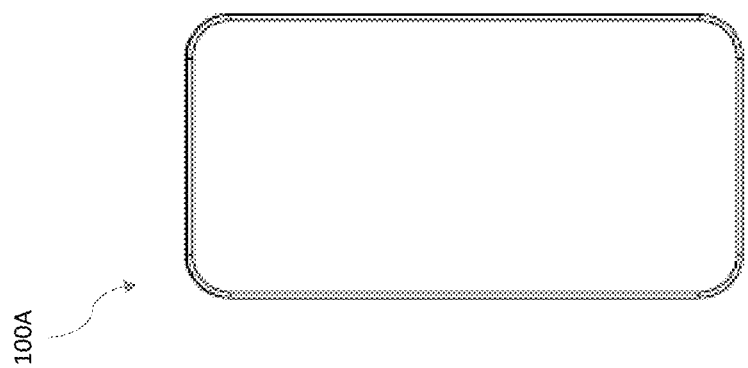

FIG. 3 shows that the clip 100 can include a front portion 102 coupled with a base portion 104. The front portion can have a first end 106 and second end 108. The first end 106 can be the end positioned opposite the second end 108. The front portion 102 can also include a slot 110. The slot 110 can be curved with a concave side. The concave side of the slot 110 can face towards the first end 106 of the front portion. In a modified embodiment, the slot 110 can be formed on the base portion 104. The first end 106 can include a magnet housing 112 configured for holding a front magnet 114. The front magnet 114 may be fixed into the magnet housing 112 using a pressure fit, adhesives, or magnetic forces.

Figures 2, 2A, 3, 4, 5, 6:
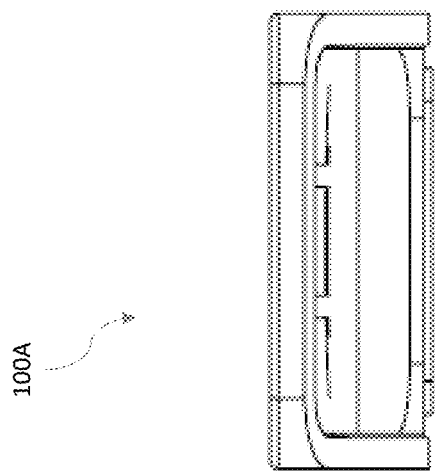
Figures 2, 2A, 3, 4, 5:
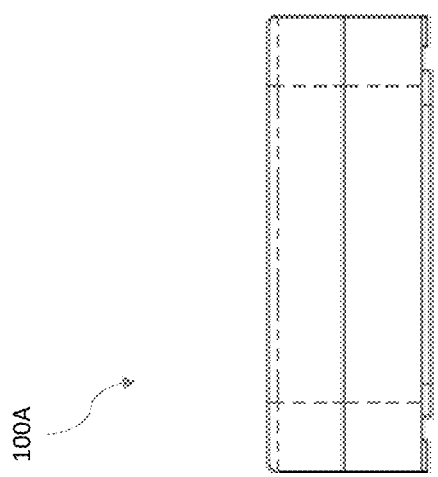

The magnet housing 112 may include or may abut an undercut 113. The undercut 113 can prevent the front magnet 114 from moving into direct contact with the base portion 104. FIGS. 4-5 show that the undercut 113 can be located at or adjacent to an inner surface 118 of the front portion 102. The undercut 113 may have a smaller diameter, or other dimension, than a larger portion of the magnet housing 112. In some embodiments, the magnet housing 112 and the front magnet 114 can be circular, rectangular, or another shape. In one example, the magnet housing 112 can be formed around the magnet 114 such that a unitary or monolithic portion of the housing can retain the magnet 114. This structure is advantageous when the front magnet 114 or a corresponding magnet in the base portion 104 is a rare earth material magnet or another magnet of high strength. The front magnet 114 may have an associated magnetic field, the associated magnetic field oriented to provide a maximum magnetic force in a direction perpendicular to the outer surface 116 of the front portion 102.

The inner surface 118 of the front portion 102 can be disposed opposite the outer surface 116. The outer surface 116 can be a rectangular shape with the length from the first end 106 to the second end 108 being greater than the width. The outer surface 116 can be a smooth finish without perforations or other features. The inner surface 118 can include struts 120. Struts 120 can connect the magnet housing 112 to a sidewall 122 of the front portion 102. Struts 120 can provide support to the front portion 102 to reduce deflection under loaded conditions. For example, the struts 120 can reduce deflection when a load is applied to open the clip 100 to receive paper or other articles. The sidewall 122 can be formed projecting from the outer surface 116 to the inner surface 118. The inner surface 118 can include various cavities 124. The cavities 124 are at least partially defined between the various struts 120 and in some cases between the struts 120 and the sidewall 122. The inner surface 118 also can include peripheral surface that faces in the direction away from the outer surface 116 around the periphery of the front portion 102.

The distance from the outer surface 116 to the top 126 of the sidewall 122 can vary along the circumference of the front portion 102. The sidewall 122 may be taller (as measured from the outer surface 116) in the vicinity of the slot 110 than adjacent regions of the sidewall 122 along the lateral side of the front portion 102. This arrangement can enable a greater range of motion for a pivot widening mechanism associated with the slot 110. The larger sidewall 122 height enables the slot 110 to have a greater length in a direction extending away from the outer surface 116 while maintaining a preferred level of durability. The sidewall 122 may have a slope at the transition 121, sloping away from the first end 106 to the pivot widening mechanism.

The sidewall 122 height may be least at the second end 108 to improve ergonomics by reducing the minimum size of the clip 100 when it is in the fully open configuration. The sidewall 122 could be eliminated at the second end 108 such that the front portion 102 has the thickness of the layers including the outer surface 116. The height of the sidewall 122 may vary from a value at the slot 110 to a different value at the second end 108. In some embodiments, the sidewall 122 height may reach a minimum at the second end 108. To facilitate holding planar objects, the sidewall 122 can have a constant height from adjacent to the slot 110 to the first end 106. The transition 121 can be present a steep change in height between the constant height portion to a location close to the slot 110 but on the side thereof closer to the first end 106.

The base portion 104 can include a narrow portion 140 and a wide portion 144. The narrow portion 140 can be the portion that is disposed adjacent to the second end 108. The wide portion 144 can be the portion that is disposed adjacent to the first end 106. The base portion 104 can also include a connector 148 that couples the front portion 102 to the base portion 104. The connector 148 can include one or more projections that are round or circular in cross-section. In one embodiment, the connector 148 can include a projection disposed on each lateral side of the base portion 104. The connector 148 can have a length that is sufficient to extend into the slot 110 and in some cases to or adjacent to the outer lateral surface of the front portion 102. The connector 148 can be configured as a pin but with a blunt end. In a modified embodiment, the connector 148 can include a projection, e.g., a pin, formed or disposed on the front portion 102.

The narrow portion 140 can be narrow enough to nest within the sidewalls 122 at the second end 108. The narrow portion 140 may taper in height, such that the height on the narrow portion 140 reaches a minimum near the second end 108. In this context, height is measured in a direction from the outward facing side of the base portion 104 to the side facing the front portion 102. The minimum height of the narrow portion 140 may be small enough to allow the narrow portion 140 to be flush with the sidewall 122 at the second end 108 when the clip is in an open configuration. An interface 150 between the narrow portion 140 and the wide portion 144 can be sloped. The slope of the interface 150 can correspond to a slope of the sidewall 122 at the transition 121. The height of the wide portion 144 can be constant. The width of the wide portion 144 can substantially equal the outer dimension of the sidewall 122, e.g., can be substantially equal to the distance from a first lateral portion of the sidewall 122 to a second lateral portion of the sidewall 122 opposite the first lateral portion. The narrow portion 140 allows a portion of the base portion 104 to nest within the front portion 102 and the wide portion 144 allows a portion of the base portion 104 to be flush with the front portion 102. The lateral sides of the wide portion 144 can be flush with the adjacent portion of the sidewall 122.

In a closed configuration, the inner surface 152 of the base portion 104 can contact the top 126 of the sidewall. The contacting surfaces can include the sidewall 122 up to and including interface 150 and the transition 121. In the closed configuration the sloped surface of the interface 150 and the sloped surface of the transition 121 can be parallel, abutting, or facing each other. An outer surface 156 of the base portion 104 can be planar. A planar design can allow the clip to have superior adherence to a mounting surface.

As depicted in FIG. 4, a magnet retention space 160 can be disposed through the base portion 104. The magnet retention space 160 can be configured to retain a base magnet 164. The magnet retention space 160 may include a retaining feature 168. The retaining feature 168 can be an annular rib projecting into the magnet retention space 160. The retaining feature 168 can be molded as part of the magnet retention space 160 and can have a diameter less than the diameter of an outer edge 172 and an inner edge 176 of the magnet retention space 160. The base magnet 164 can be shaped to correspond to the magnet retention space 160. In some embodiments, the base magnet 164 has a central region 180 with a reduced diameter. The base magnet 164 can have an annular channel that receives the annular rib of the retaining feature 168. The base magnet 164 can be press-fit into the magnet retention space 160 or the base portion 104 can be formed around the base magnet 164. For example, the front portion 102 can be molded such that the material of the front portion 102 flows into the channel of the central region 180 and solidifies therein into the annular rib of the retaining feature 168. In the illustrated embodiment, the base portion 104 includes a support 184. The support 184 can be cylindrical in shape, e.g., semi-circular in cross-section and molded as a single piece with the base portion 104. In some embodiments, the support 184 bears applied forces on the clip 100 and improves rigidity. In another embodiment the support 184 can be disposed on, e.g., molded with the front portion 102. The support 184 can be offset from the connector 148 such that a load applied at the second end 108 (as seen in FIG. 6) can act around or over the support 184. The support 184 creates a secondary pivot point that provides enhanced opening of the clip 100. A first pivot between the front portion 102 and the base portion 104 can occur around the slot 110 and the connector 148. The first pivot enables the magnets to be separated by the leverage provided therein. A second pivot between the front portion 102 and the base portion 104 can occur around the support 184. The second pivot enables enhanced opening of the clip 100. The portion of the front portion 102 adjacent to the second end 108 can act as a lever over the support 184 to help separate the strong attraction of the front magnet 114 and the base magnet 164.

In some embodiments, a traction pad 188 can be affixed to the outer surface 156 to provide additional friction force or traction when the clip 100 is mounted to a mounting surface.

The base magnet 164 may have an associated magnetic field, the associated magnetic field oriented to provide a maximum magnetic force in a direction perpendicular to the outer surface 156 of the base portion 104. The base magnet enables the clip to be coupled to a ferromagnetic surface.

The front magnet 114 and the base magnet 164 are assembled to the clip 100 such that opposite poles of the magnets are facing towards the interior of the clip. This arrangement results in a magnetic force urging the front portion 102 and the base portion 104 together in the vicinity of the first end 106. This holding force is sufficient to retainer the object 101 in the clip 100 even against the force of gravity as in FIG. 1.

FIG. 5 shows the clip 100 loaded with an object 101. Under this loading condition the front portion 102 and the base portion 104 can be spaced apart. The attraction force applied between the front magnet 114 and the base magnet 164 can be applied to the object 101. In this configuration, the connector 148 can be translated and/or rotated relative to the slot 110. If the object 101 is not present in the clip the connector 148 can be located in the slot 110 at a position closest to the outer surface 116 of the front portion 102 (see FIG. 2A-1). If the first end 106 of the clip 100 is opened, the connector 148 can move to the opposite end of the slot 110, adjacent to the top 126 of the sidewall 122 (see e.g., FIG. 2A-2 and FIG. 3). If the object 101 is present in the clip 100 the front portion 102 and the base portion 104 can pivot relative to each other from an orientation where these portions converge toward the first end 106 to a position where these portions are parallel (as in FIGS. 2A-8 and 5) or even diverge toward the first end 106. The translation and/or rotation of the connector 148 relative to the slot 110 thus can allow the clip to accommodate objects with varying thicknesses.

In some embodiments, the angle between the front magnet 114 and base magnet 164 is the same for different objects that have different thicknesses. This may allow the magnetic force between the front magnet 114 and the base magnet 164 to be maximized for any thickness within a capacity range, by keeping the front magnet 114 and the base magnet 164 aligned, e.g., parallel to each other. Similarly, the bearing surfaces, the surfaces abutting the object 101, on both the front portion 102 and the base portion 104 can be maintained parallel each other, and to the object 101. This may be beneficial for reducing the maximum pressure exerted on any component of the clip 100, and may therefore improve the longevity of the clip 100. This may also maximize friction between the inner surfaces of the front portion 102 and the object 101 and between the inner surfaces of the base portion 104 and the object 101.

As shown in FIG. 5, the struts 120 can have sloped ends 196. Similarly, in some embodiments, a sloped end 192 can correspond to the sidewall 122 at the second end 108. The sloped end 192 can be sloped such that when the clip 100 is in an opened configuration, the sloped end 192 is flush with the outer surface 156, such as when the narrow portion 140 pivots into a space partly surrounded by the sidewall 122. In some embodiments, the slope of the sloped end 192 is the same as the slope of the sidewall 122 adjacent to the sloped end 192. The sloped ends 196 of the struts 120 can have the same slope as a support 199 extending from a magnet retaining cavity wall 197 and towards the second end 108. The support 199 can be located in or toward the center of the front portion 102.

As shown in FIGS. 4 and 5, the undercut 113 can allow the front magnet 114 to be retained within the front portion 102. The undercut 113 can be a circular opening with a smaller diameter than a magnet retaining cavity 115. The transverse width dimension, e.g., diameter, of the magnet retaining cavity 115 can be about the same as the front magnet 114. The height of the magnet retaining cavity 115 can be less than, e.g., about one-half of the height of the magnet retention space 160. The larger size of the space 160 can allow a larger and more powerful magnet to be disposed therein. This can enable the magnet 164 to be of sufficient strength to provide for supporting the clip 100 on a vertical surface. The undercut 113 retains the front magnet 114 in the magnet retaining cavity 115. The undercut 113 can maintain a space between the front magnet 114 and the object 101, or the base magnet 164. The space can be between the front magnet 114 and the base magnet 164. As discussed above, the undercut 113 also retains the front magnet 114 in the cavity 115. When the clip 100 is in a closed configuration, the space between the front magnet 114 and the base magnet 164 makes it easier to open the clip 100, and reduces wear between the front magnet 114 and the base magnet 164. Also, the base portion 104 and the magnet retention space 160 allow the base magnet 164 to be as close as possible to the structures to which the magnet is to be attracted or repelled. The magnet retention space 160 allows one side of the magnet 164 to be flush with the side of the base portion 104 facing a vertical surface to which the clip 100 is to be attracted. The magnet retention space 160 allows another side of the magnet 164 to be flush with the side of the base portion 104 facing the space in which the object 101 is to be positioned. By minimizing gaps the configuration of the clip 100 and the base portion 104 in particular maximizes the performance of the magnets 114, 164.

FIG. 6 shows the clip 100 in an open configuration. This configuration can result from a force being applied to the front portion 102 and/or the base portion 104 at the second end 108. The applied force opens the clip once the force is sufficient to overcome the magnetic forces of attraction between the front magnet 114 and the base magnet 164. Unlike a spring clip, the clip 100 can remain open without additional gripping force applied to the second end 108 once the magnetic attraction between the front magnet 114 and the base magnet 164 has been overcome.

Figures 2, 2A, 3, 4, 5, 6, 7, 8:
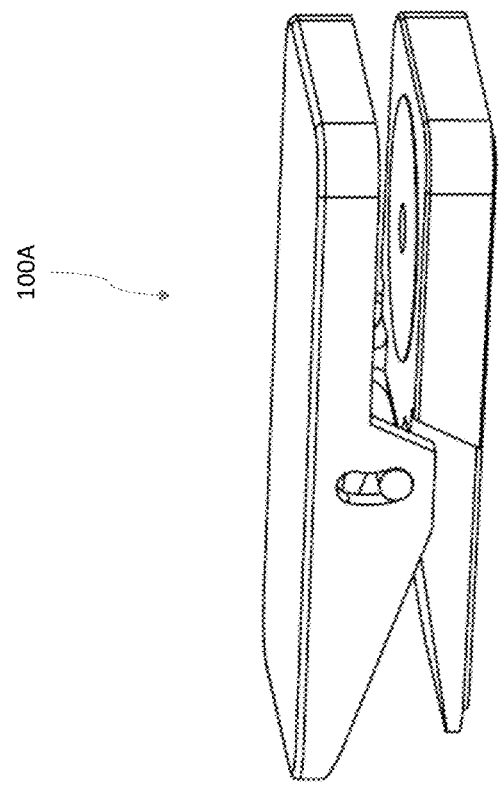
Figures 2, 2A, 3, 4, 5, 6, 7:
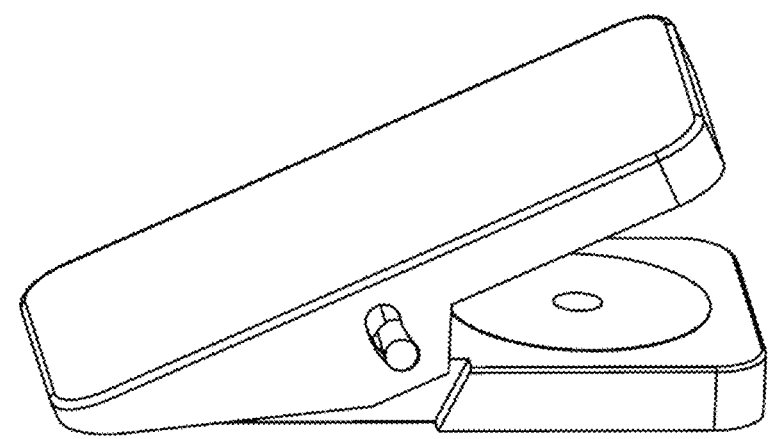

FIG. 8 shows the clip 100 in a closed configuration and without an object 101. The closed configuration of FIG. 8 is lower profile than the open configuration of FIG. 2A-8 by virtue of the connector 148 moving in the slot 110 and the base portion 104 at least partially being received in the front portion 102.

Figures 2, 2A, 3, 4, 5, 6, 7, 8, 9:
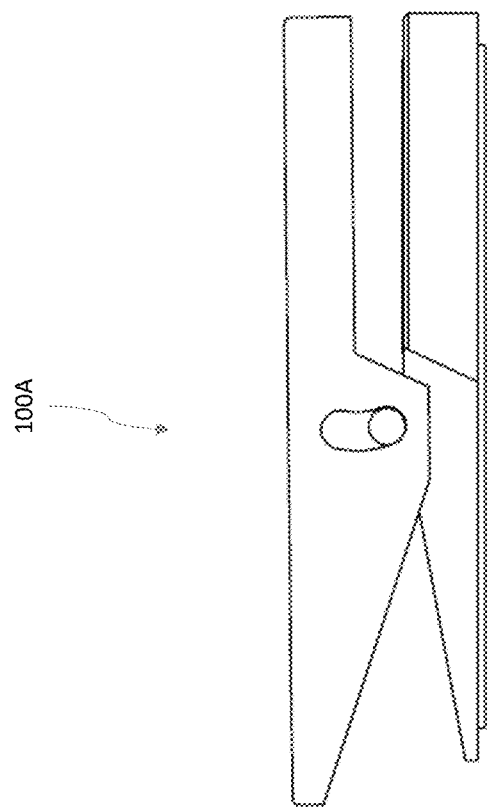
Figures 2, 2B:
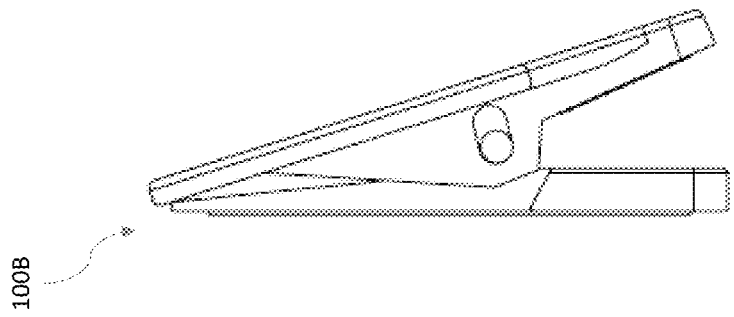
Figures 1, 2B:
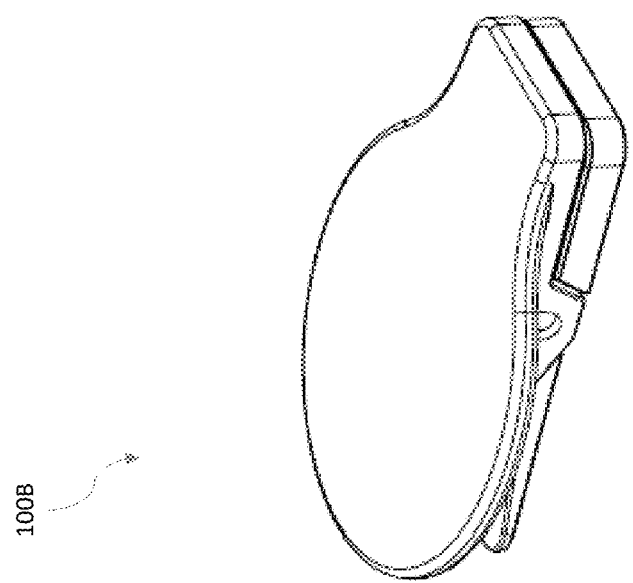
Figures 2, 2B, 3, 4:
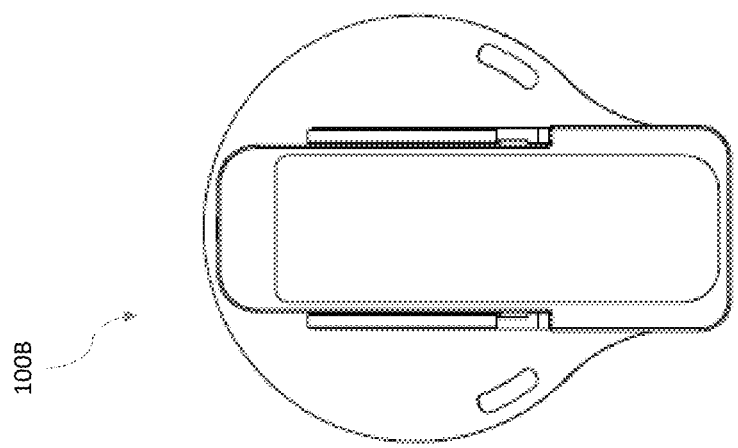
Figures 2, 2B, 3:
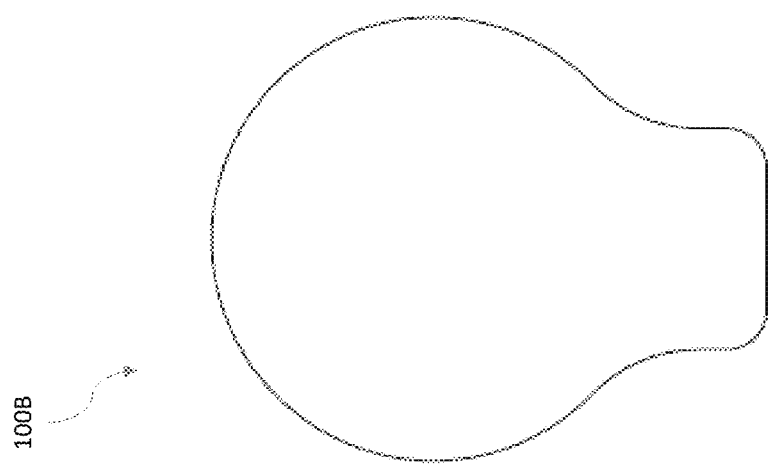
Figures 2, 2B, 3, 4, 5, 6:
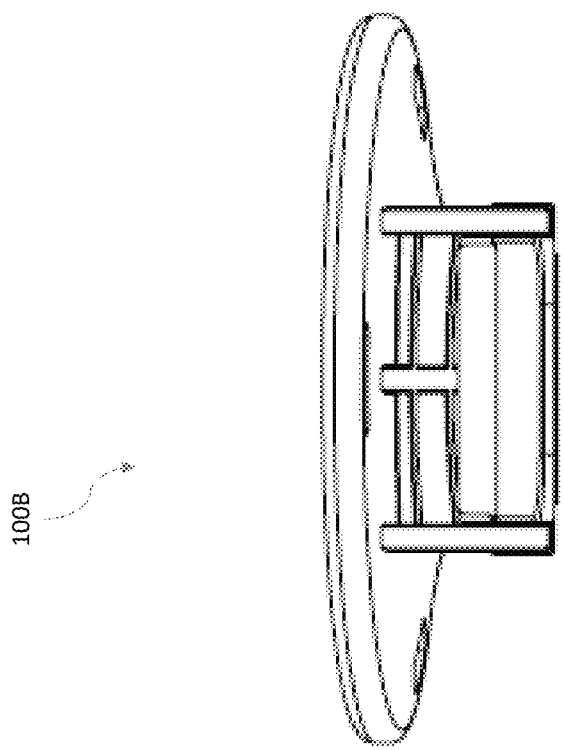
Figures 2, 2B, 3, 4, 5:
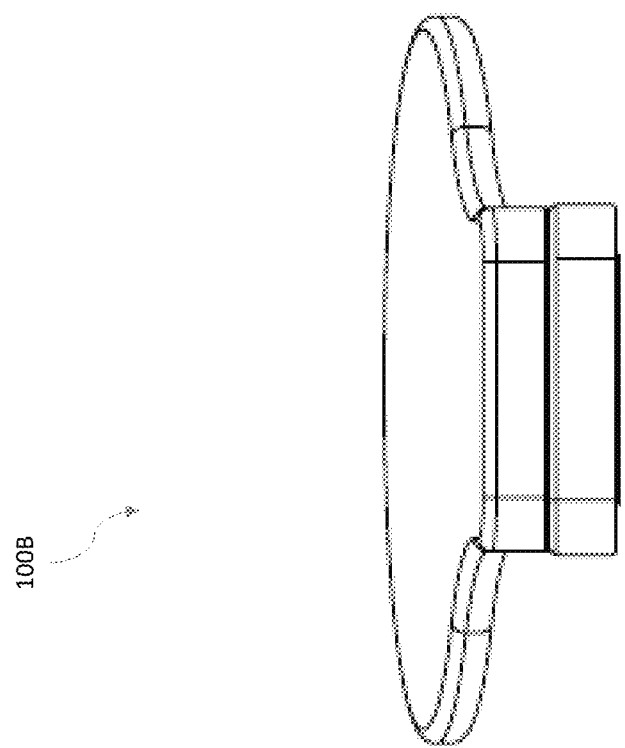
Figure 3:
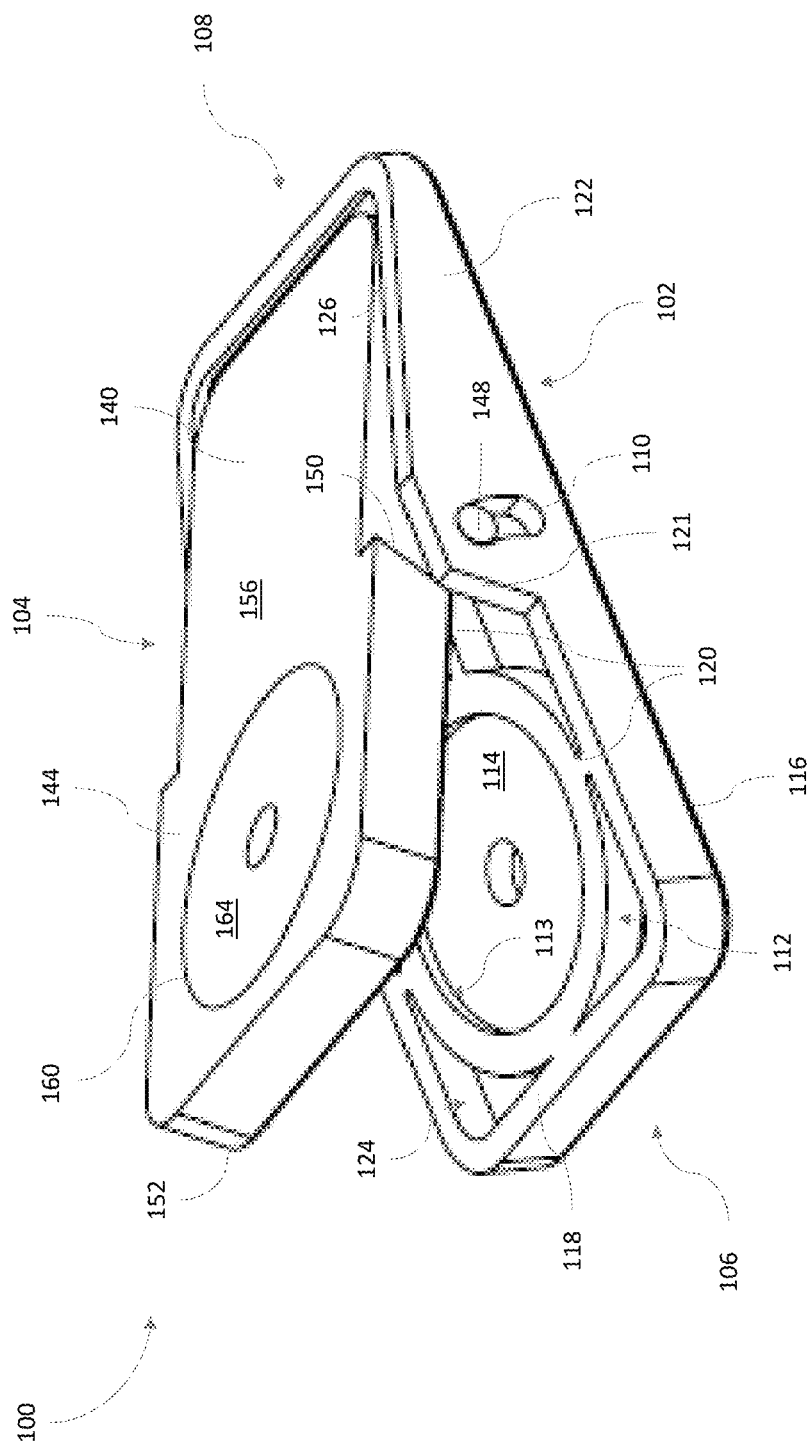
Figure 4:
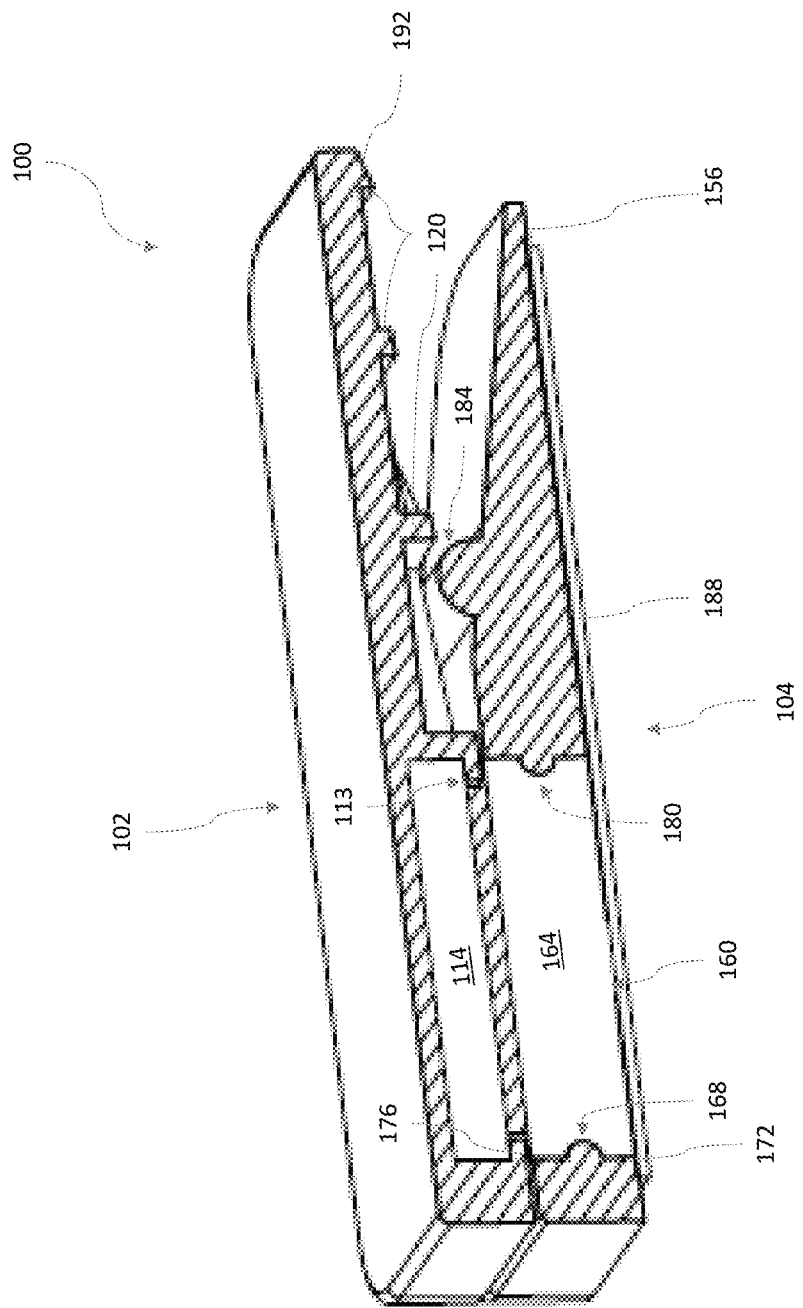
Figure 5:
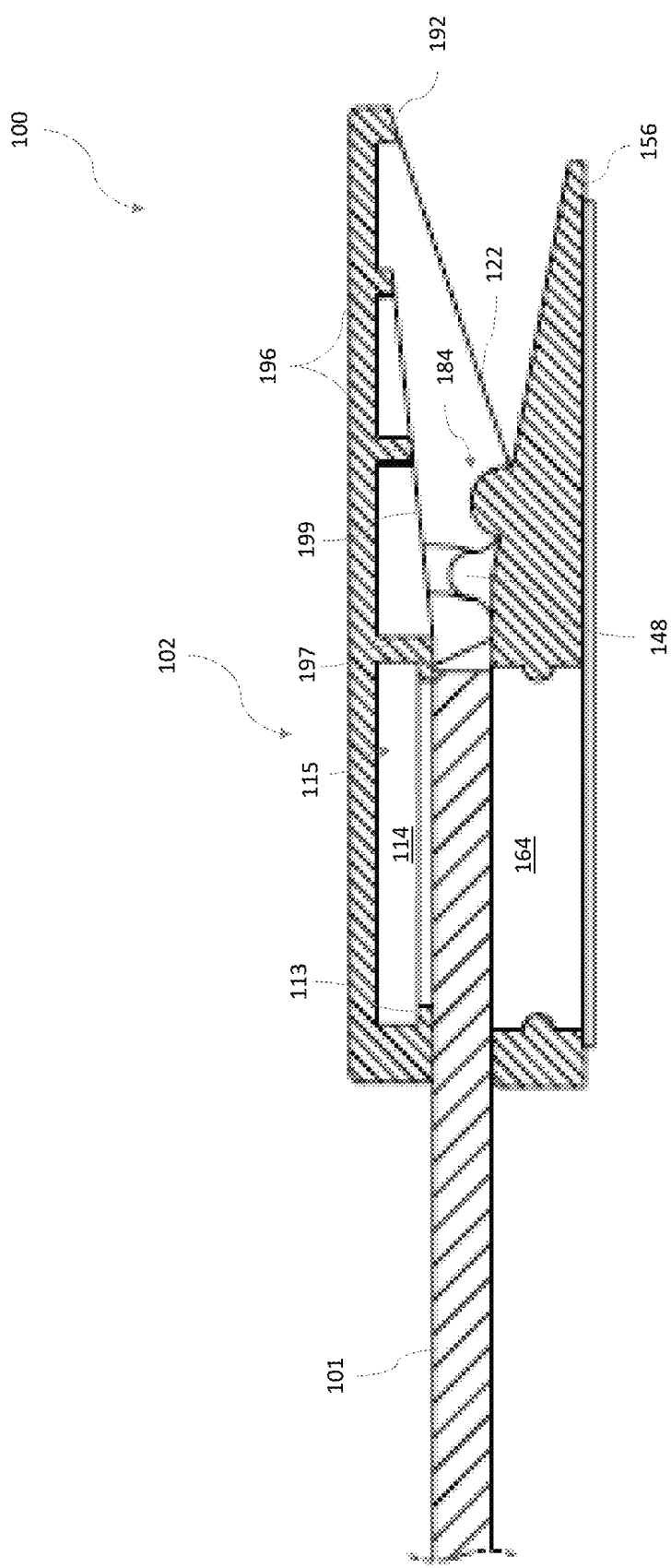
Figure 6:
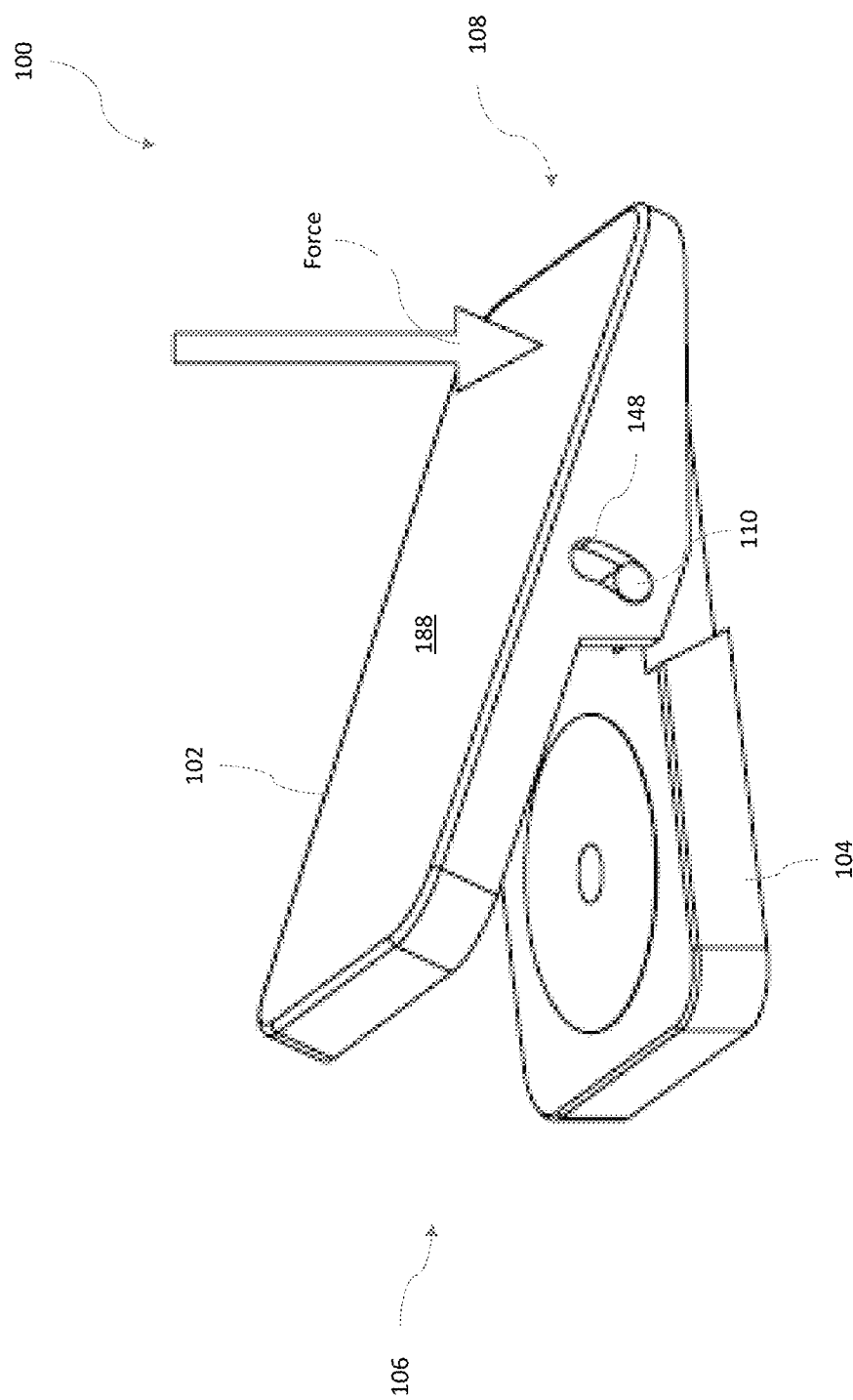
Figure 7:
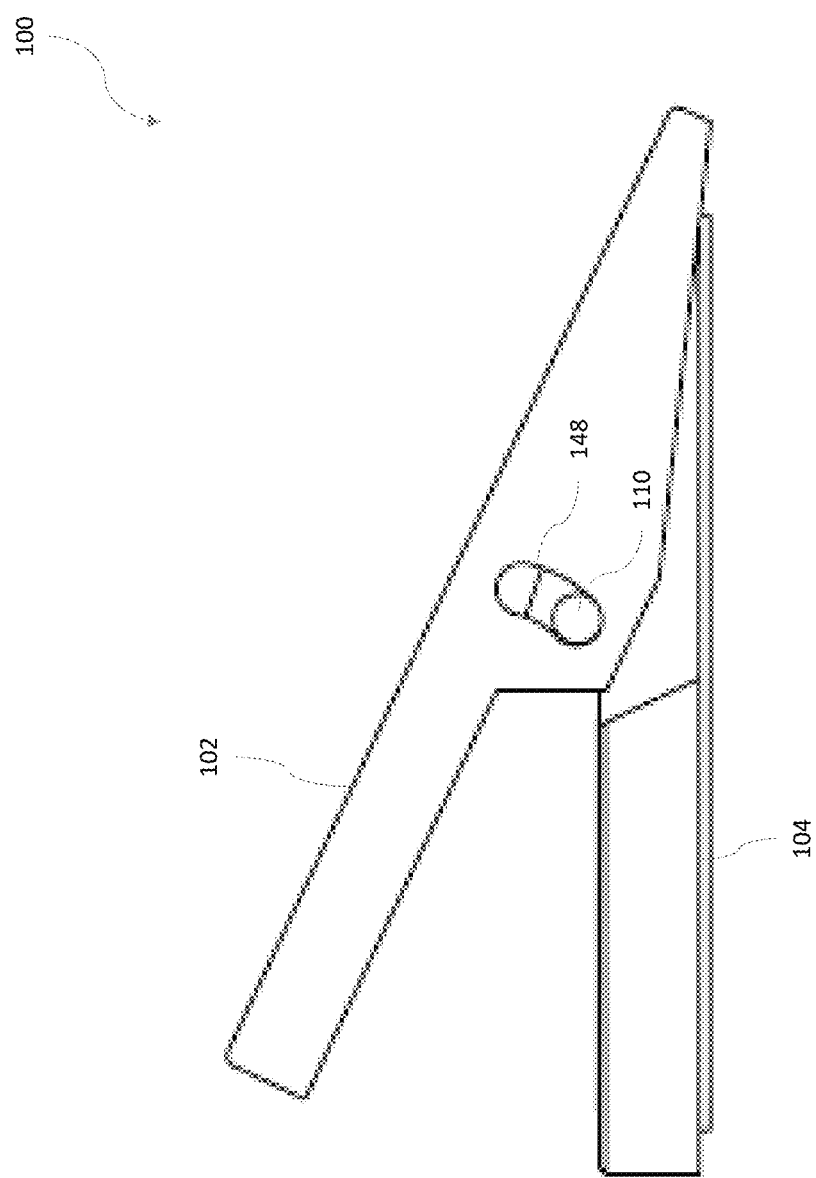
Figure 8:
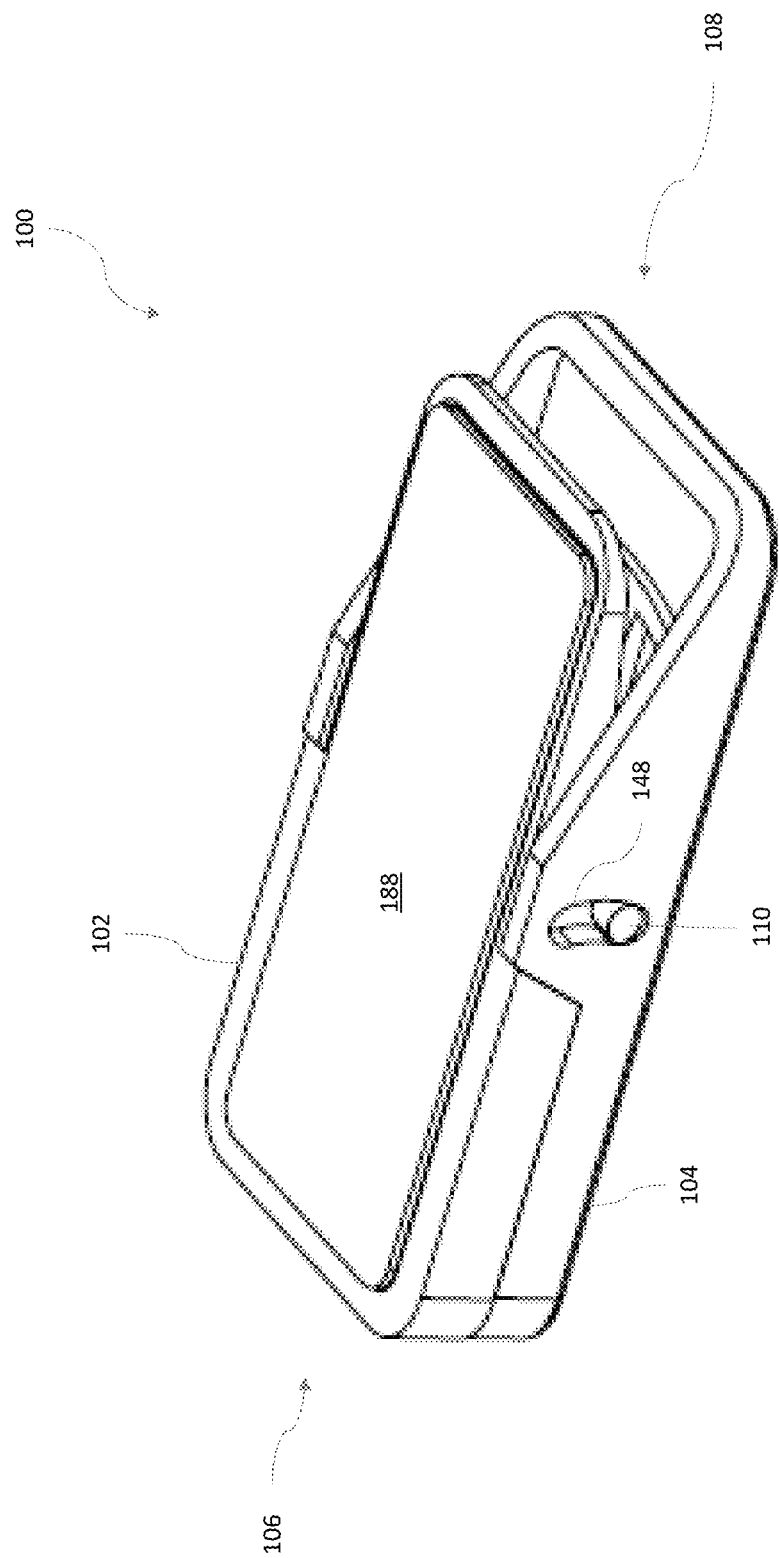
Figure 10:
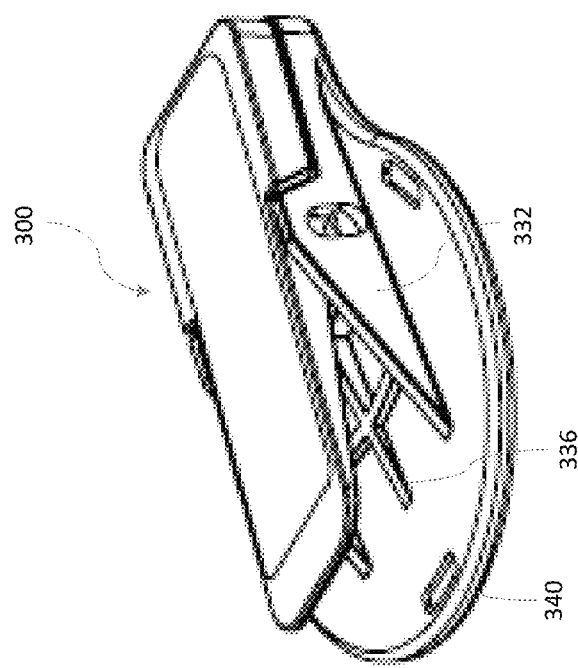
FIG. 10 is a rear perspective view of the clip of FIG. 9 with a traction pad attached.
Figure 9:
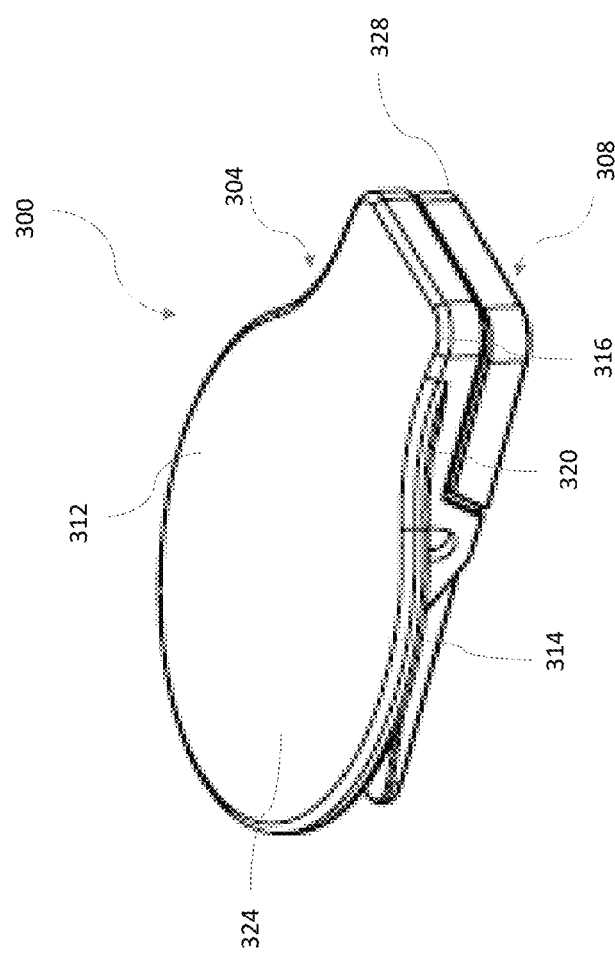

FIGS. 9 and 10 show an embodiment of a clip 300. The clip 300 is similar to the clip 100 with various differences as will be explained further in this document. The disclosure of the clip 100 where not inconsistent shall be considered to supplement and is hereby incorporated into the description of the clip 300. Likewise, features of the clip 300 can be incorporated into the clip 100. The clip 300 can include a front portion 304 and a base portion 308. The front portion 304 can have an enlarged portion with an enlarged outer surface 312. The enlarged outer surface 312 can have rounded, or beveled edges 314. The enlarged outer surface 312 can be used for enhanced gripping and/or displaying graphics such as advertisements or instructions. The enlarged outer surface 312 can have a rectangular portion 316, a transition portion 320, and an expanded portion 324. The rectangular portion 316 can correspond to the location where the clip 300 opens to receive an object 101 and as such can correspond to the location of the gripping features (e.g., magnets as in clip 100) of the clip 300. The rectangular portion 316 can be sized to have sides flush with a first end 328 of the base portion 308 when in a closed configuration. The transition portion 320 and the expanded portion 324 can overhang the sidewall 332 of the front portion 308. In some embodiments, the sidewall 332 can have a U-shape with features otherwise similar to the front portion 102. The sidewall 332 can have a largely rectangular shape. The transition portion 320 and the expanded portion 324 can be supported by several struts 336. The clip 300 can have receivers 340 for enabling part of the front portion 308 to be removed.

Figure 11:
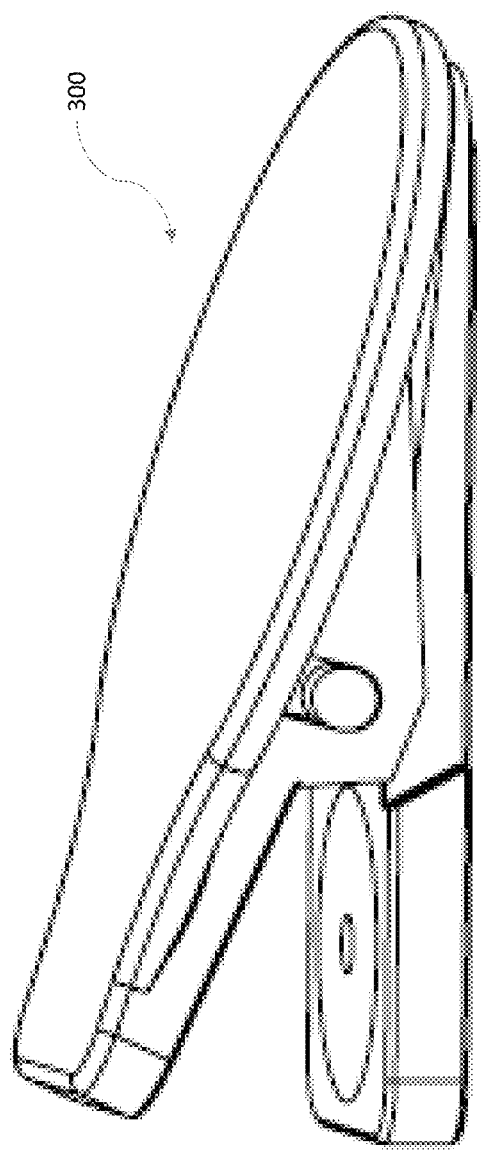
FIG. 11 is a side perspective view of the clip of FIG. 9.

FIG. 11 depicts the clip 300 in an open configuration.

Figure 12:
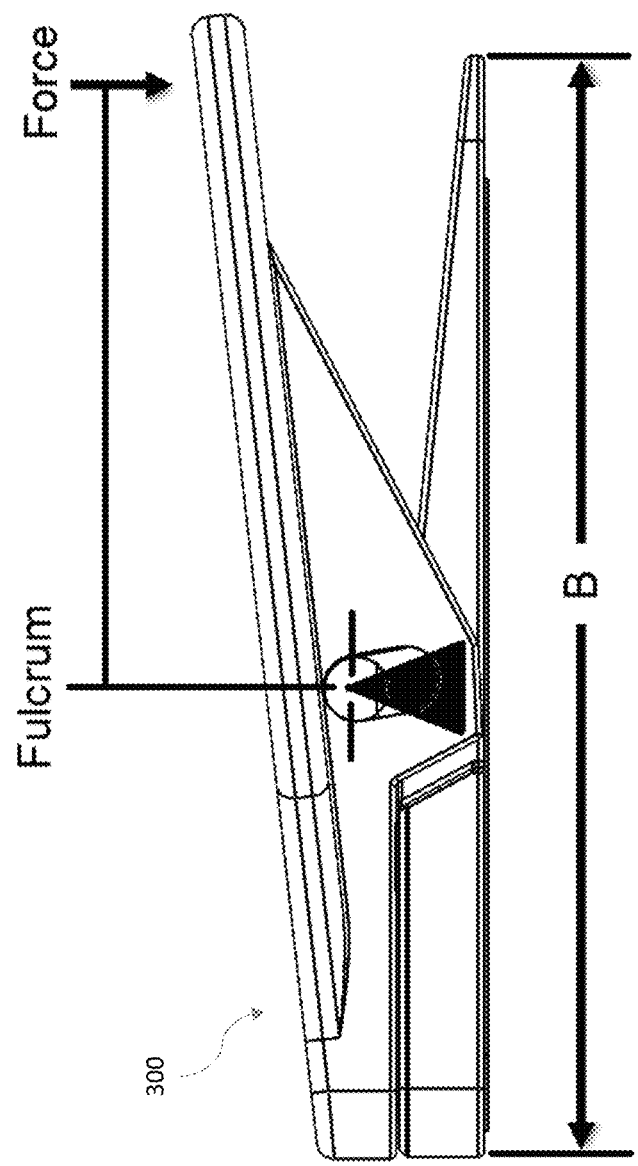
FIG. 12 is a side view of the clip of FIG. 9 demonstrating a method of separating a first clip portion from a second clip portion.

As shown in FIG. 12, the clip 300 can be opened by applying a force, as discussed with relation to clip 100.

Figure 13:
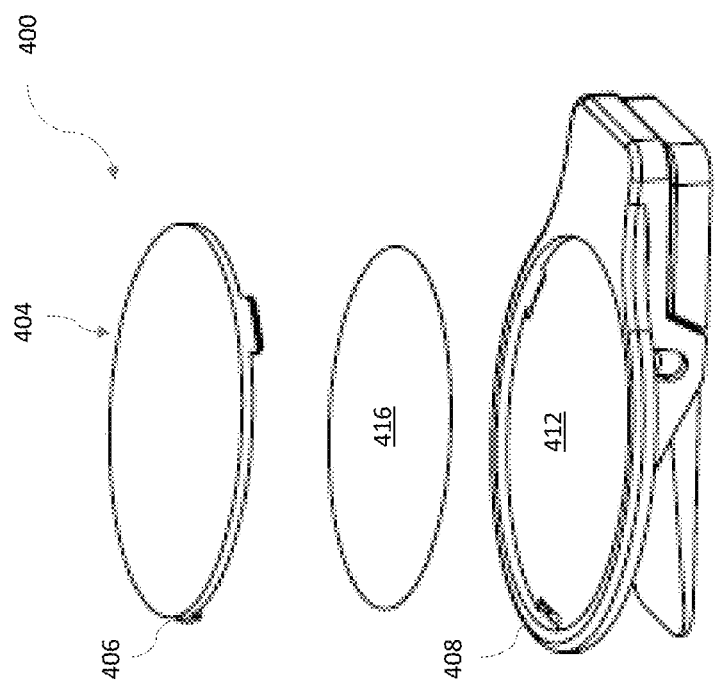
FIG. 13 is an exploded view of another embodiment of a clip.

FIG. 13 depicts an embodiment of a clip 400. The clip 400 is similar to the clip 300 with various differences as will be explained further in this document. The disclosure of the clips 100, 300 where not inconsistent shall be considered to supplement and is hereby incorporated into the description of the clip 400. Likewise, features of the clip 400 can be incorporated into the clips 100, 300. Clip 400 can have a removable cover 404. The removable cover 404 can have pegs 406 that fit into receivers 408 disposed on an enlarged portion of a front portion 402. The removable cover 404 can be circular. When the removable cover is mounted to the clip 400, there can be a thin space between the removable cover 404 and an inset 412. The thin space can be sufficient to hold a piece of paper or other thin object 416. The removable cover 404 can transparent. This arrangement is useful for putting advertising, or other information in a highly visible position on the clip 400. As discussed above, a magnet mounted in a base portion 403 of the clip 400 can support the base portion on a vertical surface leaving as highly visible the material disposed in the inset 412.

Figure 14:
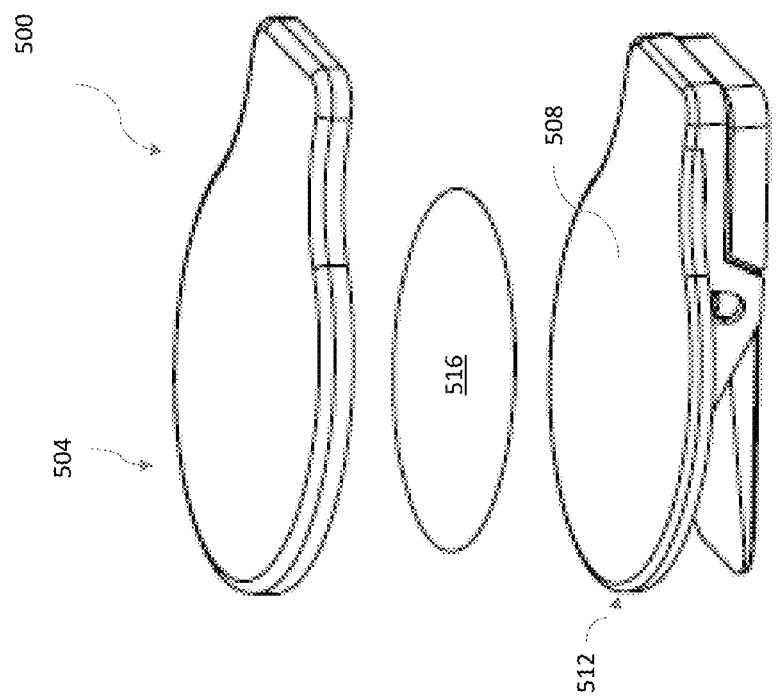
FIG. 14 is an exploded view of another embodiment of a clip.

FIG. 14 depicts an embodiment of a clip 500. The clip 500 is similar to the clip 400 with various difference as will be explained further in this document. The disclosure of the clips 100, 300, 400 where not inconsistent shall be considered to supplement and is hereby incorporated into the description of the clip 500. Likewise, features of the clip 500 can be incorporated into the clips 100, 300, 400. Clip 500 can have a removable cover 504. The removable cover 504 can have a cross-section that is similar to the cross-section of a top surface 508 of a front portion 512. The removable cover 504 can be attached to the front portion 512. The cover 504 can have a sidewall that has the same peripheral shape as the front portion 512. The cover can extend over the entire outer periphery of the front portion 512 in some embodiments. In some embodiments, the removable cover 504 is transparent. When the removable cover 504 is attached to the front portion 512 a space can exist between the front portion 512 and the removable cover 504. This space can be large enough to fit a thin object 516. The thin object 516 can be the same shape as the object 416, e.g., circular in outer periphery or can be a shape that corresponds to the outer periphery of the cover 504.

The devices described herein are presenting, storing, and/or dispensing solution for items such as papers, charts, and/or notes. In some embodiments, the item(s) may be held by pinching the item(s) between two magnets or more than two magnets.

The magnets inside of the device may also be used to attach the device (and items it is pinching/holding) to surfaces such as magnetic glass markerboards, magnetic whiteboards, and/or other ferromagnetic surfaces.

In some embodiments, the device may include 2 magnets. One magnet may be disposed in the lid (e.g., the front portion 102 for example as shown in FIG. 3) and one magnet may be disposed in the base (e.g., the base portion 104 as shown in FIG. 3).

The lid and base components may be connected through a pivot point (e.g., the connector 148). The pivot point may allow the mouth of the device to be opened while keeping the lid and base connected.

The 2 (or more) magnets may be oriented to be magnetically attracted to each other (for example, with north pole of the front magnet 114 facing the south pole of the base magnet 164 as shown in FIG. 4). In one modified embodiment, two or more magnets can be configured to repel each other to cause a clamping or gripping force to be applied at the location where the object 101 is to be held. For example, the magnet housing 112 can be located at the second end 108 of the front portion 102. The magnet retention space 160 can be located at the second end 108 of the base portion 104. The front magnet 114 and the base magnet 164 can be configured with same poles facing each other, e.g., north pole facing north pole and south pole facing south pole. The magnets 114, 164 can thus repel each other causing a clamping or gripping force to be applied in the space where the object 101 may be positioned.

The object 101 (e.g., paper or item to be held) may be pinched between the base and lid magnets as illustrated in FIG. 5. These same magnets may also work to attach to ferromagnetic surfaces such as glass markerboards and/or whiteboards.

The pivot point between the base and lid may be oriented in such a way as to allow the mouth (at the first end 106) to be opened by pressing on the back of the lid as illustrated in FIG. 6. The mouth may be opened to more easily insert and/or remove the object(s) 101 to be held.

The device may include a widening/pivoting mechanism, e.g., the combination of the slot 110 and the connector 148, between the lid and base components (for example, as shown in FIG. 7). This widening/pivoting mechanism can allow the lid and base to remain normal to the top and bottom faces of the item being held. This can allow more contact/friction between the device and the item(s) being held. The increase of friction can help keep the item(s) from slipping out.

The inside face of the lid and/or base may include a silicone traction layer or pad to further increase friction between the device and the item(s) being held.

An additional silicone traction layer or pad may be included on the bottom of the base as shown in FIG. 8.

The traction pad can increase the friction between the device and the surface it is attaching to such as a whiteboard, glass markerboard, and/or other ferromagnetic surface.

As used herein, the relative terms "top" and "bottom" shall be defined from the perspective of what is visible to the user when the eraser assembly is held around the housing 304. Thus, top refers the direction toward the exposed side of the housing 304 farthest from the side 608, while bottom refers to the direction toward the side 608.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The terms "approximately," "about," and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Further, the actions of the disclosed processes and methods may be modified in any manner, including by reordering actions and/or inserting additional actions and/or deleting actions. Thus, it is intended that the scope of at least some of the present inventions herein disclosed should not be limited by the particular disclosed embodiments described above. The limitations in the claims are to be interpreted broadly based on the language employed in the claims and not limited to the examples described in the present specification or during the prosecution of the application, which examples are to be construed as non-exclusive.

What is claimed is:

1. A clip configured to secure an object against a marking surface, the clip comprising:
   a front portion having a first end, a second end opposite the first end, an inner surface, and an outer surface, the inner surface of the front portion being configured to face the object and the outer surface of the front portion being configured to face away from the marking surface;
   a base portion having a first end, a second end opposite the first end, an inner surface, and an outer surface, the inner surface of the base portion being configured to face the object and the outer surface of the base portion being configured to be disposed adjacent to the marking surface;
   a connector coupling the front portion to the base portion such that the front portion is movable relative to the base portion, the connector comprising a pivot widening mechanism;
   the pivot widening mechanism comprising a slot on one of the front portion and the base portion and a projection on the other of the front portion and the base portion to allow the front portion and the base portion to pivot and to translate relative to each other as the projection moves along the slot;
   at least one magnet being coupled to at least one of the front portion and the base portion, the at least one magnet urging the inner surface of the front portion and the inner surface of the base portion together to apply a holding force to the object;
   wherein the connector is configured to allow the inner surface of the front portion and the inner surface of the base portion to be substantially parallel over a range of separation distances between the inner surface of the front portion and the inner surface of the base portion.

2. The clip of claim 1, wherein the projection comprises an elongate circular member.

3. The clip of claim 1, wherein the at least one magnet comprises a first magnet and a second magnet, the first magnet being coupled to the front portion and the second magnet being coupled to the base portion, wherein the clip is configured to grip the object between the first magnet and the second magnet, the first magnet being magnetically attracted to the second magnet.

4. The clip of claim 3, wherein at least one of the first magnet and the second magnet is configured to cause the clip to magnetically couple to the marking surface.

5. The clip of claim 1, further comprising a high friction member coupled to the outer surface of the base portion.

6. The clip of claim 1, wherein the slot is curved, the concave side of the curve facing towards the at least one magnet.

7. The clip of claim 1, wherein the slot has a substantially constant width.

8. The clip of claim 1, wherein the clip exerts a maximum clamping force between the inner surface of the front portion and the inner surface of the base portion when the distance between the inner surface of the front portion and the inner surface of the base portion is at a minimum.

9. A clip configured to secure an object, the clip comprising:
   a front portion having a first end, a second end opposite the first end, an inner surface, and an outer surface, the outer surface of the front portion being configured to face away from the inner surface of the front portion;
   a base portion having a first end, a second end opposite the first end, an inner surface, and an outer surface, the inner surface of the base portion being configured to face the inner surface of the front portion, the outer surface of the base portion being configured to face away from the inner surface of the base portion;
   a connector coupling the front portion to the base portion such that the front portion is movable in two degrees of freedom relative to the base portion, the connector configured to allow the inner surface of the front portion and the inner surface of the base portion to be substantially aligned over a range of separation distances between the inner surface of the front portion and the inner surface of the base portion; and
   at least one magnet being coupled to at least one of the front portion and the base portion, the at least one magnet urging the inner surface of the front portion and the inner surface of the base portion together;
   wherein the connector is configured to allow the inner surface of the front portion and the inner surface of the base portion to be substantially parallel over a continuous range of separation distances between the inner surface of the front portion and the inner surface of the base portion.

10. The clip of claim 9, wherein the connector comprises a pivot widening mechanism.

11. The clip of claim 9, wherein the at least one magnet comprises a first magnet and a second magnet, the first magnet being coupled to the front portion and the second magnet being coupled to the base portion, wherein the clip is configured to grip the object by the first magnet and the second magnet repelling one another.

12. The clip of claim 9, wherein the at least one magnet comprises a first magnet and a second magnet, the first magnet being coupled to the front portion and the second magnet being coupled to the base portion, wherein the clip is configured to grip the object by the first magnet being magnetically attracted to the second magnet.

13. The clip of claim 12, wherein at least one of the first magnet and the second magnet is configured to cause the clip to magnetically couple to a marking surface when positioned thereon.

14. The clip of claim 10, wherein the pivot widening mechanism comprises a slot and a slender projection.

15. The clip of claim 14, wherein the slot is curved, the concave side of the curve facing towards the at least one magnet.

16. The clip of claim 14, wherein the slot has a substantially constant width.

17. The clip of claim 9, wherein the clip exerts a maximum clamping force between the inner surface of the front portion and the inner surface of the base portion when the distance between the inner surface of the front portion and the inner surface of the base portion is at a minimum.

18. A clip configured to secure an object against a marking surface, the clip comprising:
   a front portion having a first end, a second end opposite the first end, an inner surface, and an outer surface, the inner surface of the front portion being configured to face the object and the outer surface of the front portion being configured to face away from the marking surface;
   a base portion having a first end, a second end opposite the first end, an inner surface, and an outer surface, the inner surface of the base portion being configured to face the object and the outer surface of the base portion being configured to be disposed adjacent to the marking surface;

a connector coupling the front portion to the base portion such that the front portion is movable relative to the base portion, the connector comprising a pivot widening mechanism;

the pivot widening mechanism comprising a slot on one of the front portion and the base portion and a projection on the other of the front portion and the base portion to allow the front portion and the base portion to pivot and to translate relative to each other as the projection moves along the slot, wherein the projection comprises an elongate circular member;

at least one magnet being coupled to at least one of the front portion and the base portion, the at least one magnet urging the inner surface of the front portion and the inner surface of the base portion together to apply a holding force to the object.

19. A clip configured to secure an object against a marking surface, the clip comprising:

a front portion having a first end, a second end opposite the first end, an inner surface, and an outer surface, the inner surface of the front portion being configured to face the object and the outer surface of the front portion being configured to face away from the marking surface;

a base portion having a first end, a second end opposite the first end, an inner surface, and an outer surface, the inner surface of the base portion being configured to face the object and the outer surface of the base portion being configured to be disposed adjacent to the marking surface;

a connector coupling the front portion to the base portion such that the front portion is movable relative to the base portion, the connector comprising a pivot widening mechanism;

the pivot widening mechanism comprising a slot on one of the front portion and the base portion and a projection on the other of the front portion and the base portion to allow the front portion and the base portion to pivot and to translate relative to each other as the projection moves along the slot;

at least one magnet being coupled to at least one of the front portion and the base portion, the at least one magnet urging the inner surface of the front portion and the inner surface of the base portion together to apply a holding force to the object;

wherein the at least one magnet comprises a first magnet and a second magnet, the first magnet being coupled to the front portion and the second magnet being coupled to the base portion, wherein the clip is configured to grip the object between the first magnet and the second magnet, the first magnet being magnetically attracted to the second magnet.

20. A clip configured to secure an object against a marking surface, the clip comprising:

a front portion having a first end, a second end opposite the first end, an inner surface, and an outer surface, the inner surface of the front portion being configured to face the object and the outer surface of the front portion being configured to face away from the marking surface;

a base portion having a first end, a second end opposite the first end, an inner surface, and an outer surface, the inner surface of the base portion being configured to face the object and the outer surface of the base portion being configured to be disposed adjacent to the marking surface;

a connector coupling the front portion to the base portion such that the front portion is movable relative to the base portion, the connector comprising a pivot widening mechanism;

the pivot widening mechanism comprising a slot on one of the front portion and the base portion and a projection on the other of the front portion and the base portion to allow the front portion and the base portion to pivot and to translate relative to each other as the projection moves along the slot;

at least one magnet being coupled to at least one of the front portion and the base portion, the at least one magnet urging the inner surface of the front portion and the inner surface of the base portion together to apply a holding force to the object;

a high friction member coupled to the outer surface of the base portion.

21. A clip configured to secure an object against a marking surface, the clip comprising:

a front portion having a first end, a second end opposite the first end, an inner surface, and an outer surface, the inner surface of the front portion being configured to face the object and the outer surface of the front portion being configured to face away from the marking surface;

a base portion having a first end, a second end opposite the first end, an inner surface, and an outer surface, the inner surface of the base portion being configured to face the object and the outer surface of the base portion being configured to be disposed adjacent to the marking surface;

a connector coupling the front portion to the base portion such that the front portion is movable relative to the base portion, the connector comprising a pivot widening mechanism;

the pivot widening mechanism comprising a slot on one of the front portion and the base portion and a projection on the other of the front portion and the base portion to allow the front portion and the base portion to pivot and to translate relative to each other as the projection moves along the slot;

at least one magnet being coupled to at least one of the front portion and the base portion, the at least one magnet urging the inner surface of the front portion and the inner surface of the base portion together to apply a holding force to the object;

wherein the slot is curved, the concave side of the curve facing towards the at least one magnet.

22. A clip configured to secure an object against a marking surface, the clip comprising:

a front portion having a first end, a second end opposite the first end, an inner surface, and an outer surface, the inner surface of the front portion being configured to face the object and the outer surface of the front portion being configured to face away from the marking surface;

a base portion having a first end, a second end opposite the first end, an inner surface, and an outer surface, the inner surface of the base portion being configured to face the object and the outer surface of the base portion being configured to be disposed adjacent to the marking surface;

a connector coupling the front portion to the base portion such that the front portion is movable relative to the base portion, the connector comprising a pivot widening mechanism;

the pivot widening mechanism comprising a slot on one of the front portion and the base portion and a projection on the other of the front portion and the base portion to allow the front portion and the base portion to pivot and to translate relative to each other as the projection moves along the slot, wherein the slot has a substantially constant width;

at least one magnet being coupled to at least one of the front portion and the base portion, the at least one magnet urging the inner surface of the front portion and the inner surface of the base portion together to apply a holding force to the object.

23. A clip configured to secure an object against a marking surface, the clip comprising:

a front portion having a first end, a second end opposite the first end, an inner surface, and an outer surface, the inner surface of the front portion being configured to face the object and the outer surface of the front portion being configured to face away from the marking surface;

a base portion having a first end, a second end opposite the first end, an inner surface, and an outer surface, the inner surface of the base portion being configured to face the object and the outer surface of the base portion being configured to be disposed adjacent to the marking surface;

a connector coupling the front portion to the base portion such that the front portion is movable relative to the base portion, the connector comprising a pivot widening mechanism;

the pivot widening mechanism comprising a slot on one of the front portion and the base portion and a projection on the other of the front portion and the base portion to allow the front portion and the base portion to pivot and to translate relative to each other as the projection moves along the slot;

at least one magnet being coupled to at least one of the front portion and the base portion, the at least one magnet urging the inner surface of the front portion and the inner surface of the base portion together to apply a holding force to the object;

wherein the clip exerts a maximum clamping force between the inner surface of the front portion and the inner surface of the base portion when the distance between the inner surface of the front portion and the inner surface of the base portion is at a minimum.

24. A clip configured to secure an object, the clip comprising:

a front portion having a first end, a second end opposite the first end, an inner surface, and an outer surface, the outer surface of the front portion being configured to face away from the inner surface of the front portion;

a base portion having a first end, a second end opposite the first end, an inner surface, and an outer surface, the inner surface of the base portion being configured to face the inner surface of the front portion, the outer surface of the base portion being configured to face away from the inner surface of the base portion;

a connector coupling the front portion to the base portion such that the front portion is movable in two degrees of freedom relative to the base portion, the connector configured to allow the inner surface of the front portion and the inner surface of the base portion to be substantially aligned over a range of separation distances between the inner surface of the front portion and the inner surface of the base portion; and at least one magnet being coupled to at least one of the front portion and the base portion, the at least one magnet urging the inner surface of the front portion and the inner surface of the base portion together;

wherein the at least one magnet comprises a first magnet and a second magnet, the first magnet being coupled to the front portion and the second magnet being coupled to the base portion, wherein the clip is configured to grip the object by the first magnet and the second magnet repelling one another.

* * * * *